(12) United States Patent
Schmitt et al.

(10) Patent No.: US 11,406,101 B2
(45) Date of Patent: Aug. 9, 2022

(54) DEVICE FOR PRESERVING A PREDETERMINED DOSE OF LIQUID-BASED SUBSTANCE, AND RANGE OF SUCH DEVICES

(71) Applicant: IMV TECHNOLOGIES, Saint Ouen sur Iton (FR)

(72) Inventors: Eric Schmitt, Villaines-la-Juhel (FR); Jean-Charles Gorges, Chenay (FR); Olivier Couture, Saint Ouen sur Iton (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 754 days.

(21) Appl. No.: 16/070,850

(22) PCT Filed: Jan. 19, 2017

(86) PCT No.: PCT/FR2017/050104
§ 371 (c)(1),
(2) Date: Jul. 18, 2018

(87) PCT Pub. No.: WO2017/125679
PCT Pub. Date: Jul. 27, 2017

(65) Prior Publication Data
US 2021/0059243 A1 Mar. 4, 2021

(30) Foreign Application Priority Data
Jan. 19, 2016 (FR) ...................................... 1650421

(51) Int. Cl.
*A01N 1/02* (2006.01)
*A61D 19/02* (2006.01)

(52) U.S. Cl.
CPC .......... *A01N 1/0268* (2013.01); *A61D 19/024* (2013.01)

(58) Field of Classification Search
None
See application file for complete search history.

(56) References Cited

U.S. PATENT DOCUMENTS 3,895,714 A * 7/1975 Day ........................ B65D 85/20
312/73
5,190,880 A * 3/1993 Cassou ..................... A01N 1/02
422/408

(Continued)

FOREIGN PATENT DOCUMENTS

EP 0562947 A1 * 9/1993 ............ G09F 3/0295
EP 562947 A1 * 9/1993 ............... A01N 1/02

(Continued)

*Primary Examiner* — Holly Kipouros
*Assistant Examiner* — Nathan G Esperon
(74) *Attorney, Agent, or Firm* — Browdy and Neimark, P.L.L.C.

(57) ABSTRACT

A device for preserving a predetermined dose of liquid-based substance, notably animal semen or a preservation medium containing embryos or tissue samples, comprises a tube (11) made of a weldable plastics material. The tube allows a service state in which a receiving portion (21) intended to contain the said predetermined dose has a circular cross-section whereas a sealing portion (22) comprises a welded pinch (19) and a transition zone (23). Over at least part of the sealing portion a differentiating edge region (28) gives the external surface of the tube a visual appearance different from the visual appearance of the external surface of the tube outside of the differentiating edge region. A range comprises such a device and a similar device but without the differentiating edge region.

16 Claims, 3 Drawing Sheets

(56) References Cited

U.S. PATENT DOCUMENTS

| | | | |
|---|---|---|---|
| 7,056,727 B2 * | 6/2006 | Saint-Ramon | B01L 3/502707 |
| | | | 435/307.1 |
| 2010/0107560 A1 * | 5/2010 | Ehrsam | B01L 3/50825 |
| | | | 53/375.9 |

FOREIGN PATENT DOCUMENTS

| | | | | |
|---|---|---|---|---|
| EP | 2156735 A1 * | 2/2010 | | A01N 1/0268 |
| EP | 2156735 A1 | 2/2010 | | |
| FR | 995878 A | 12/1951 | | |
| FR | 2651793 A1 | 3/1991 | | |
| FR | 2846128 A1 * | 4/2004 | | A61D 19/024 |
| FR | 2846128 A1 | 4/2004 | | |
| FR | 2912727 A1 | 8/2008 | | |
| FR | 2912737 A1 | 8/2008 | | |
| GB | 669265 A | 4/1952 | | |
| WO | WO-2014063052 A1 * | 4/2014 | | A01N 1/0268 |

\* cited by examiner

DEVICE FOR PRESERVING A PREDETERMINED DOSE OF LIQUID-BASED SUBSTANCE, AND RANGE OF SUCH DEVICES

The invention generally relates to the preservation of a predetermined dose of liquid-based substance, in particular a biological substance such as pure or diluted animal semen or a preservation medium containing embryos or tissue samples.

It is known that such preservation may be carried out with a device comprising a tube obturated after filling, then placed in a preservation chamber, for example a cryogenic preservation chamber.

French patent application 2 651 793, to which corresponds U.S. Pat. No. 5,190,880, describes a straw of which the tube is made of a thermofusible material to enable its ends to be obturated. To that end, this document describes an obturating machine comprising jaws having a heating projecting member to form, by crushing and welding each end of the tube of the straw, opposite the projecting member, a welded constriction of the wall of the tube forming a hermetic seal.

French patent application 2 912 727, to which corresponds U.S. patent application US 2010/0107560 describes a tube for packaging a predetermined volume of biological substance having the shape of a finger of a glove and made from a plastic material or a group of plastic materials enabling it to be obturated at its open end by crushing and welding, this document also describing a machine for obturating the open end of such tubes, in upright position, this machine comprising two movable jaws each having a heating projecting member to form, by crushing and welding of the upper end of the tube, opposite the projecting member, a welded constriction of the wall of the tube forming a hermetic seal.

The invention is directed to facilitating the task of the operators having to retrieve such devices placed in a preservation chamber.

To that end the invention provides a device for preserving a predetermined dose of liquid-based substance comprising a tube of weldable plastic material extending between a first end and a second end, which tube comprises a receiving section provided to contain said predetermined dose of liquid-based substance and an obturating section provided to obturate the tube after the receiving section has been filled with said predetermined dose of liquid-based substance, which obturating section extends between the first end of the tube and the receiving section, which tube has:
  an initial state in which the receiving section and the obturating section are of circular cross-section; and
  a state of use in which the receiving section is of circular cross-section while the obturating section comprises a constriction of the wall of the tube forming a hermetic seal and comprises a transition zone between the welded constriction and the receiving section;
  characterized in that the tube comprises a differentiating border over at least part of the obturating section giving the external surface of the tube a different visual appearance from the visual appearance of the external surface of the tube outside the differentiating border, which differentiating border is configured to be visible from the first end when the tube is in the state of use.

Thus, the tube in the state of use seen from the first end may be discriminated from a similar tube which does not have said differentiating border.

The invention thus gives the operators the possibility of discriminating between the two practically similar tubes while they remain in place in the vessel of the preservation chamber, that is to say without it being necessary to extract the two tubes from the vessel to consult the information written on the surface of the tube.

It is to be noted on this subject that the compartments usually used to group the preservation devices in the chamber vessel are less high than the tubes of the devices, such that the border, given its positioning, is not hidden by the compartments.

The two tubes may for example have the same color to indicate a main characteristic of the contained substance, for example that it is semen of a certain bovine breed; and the absence or the presence of the border indicates an additional feature, for example that it is male semen or female semen. Numerous other needs for discrimination between preservation devices may be met by the invention, for example the border may be used to identify a particular origin of the device in the context of a general origin.

It will be noted that the invention makes it possible to facilitate the task of the operators having to retrieve tube devices from the preservation chamber, while being simple, convenient and economical to implement since the two practically similar tubes can be manufactured in the same way and it suffices to add the border on the tubes of the devices to be discriminated.

According to preferred features:
  the differentiating border is present at least over the transition zone;
  the differentiating border is present at least over part of the receiving section neighboring the obturating section;
  the differentiating border is annular when the tube is in the initial state;
  the differentiating border extends between a first end oriented towards the first end of the tube and a second end with an opposite orientation to the first end of the tube, the first end of the differentiating border being situated in the obturating section away from the first end of the tube and the second end of the differentiating border being in the receiving section.
  when the tube is in the initial state, the distance between the first end of the differentiating border and the first end of the tube is comprised between 0.1 mm and 4 mm;
  when the tube is in the initial state, the distance between the first end and the second end of the differentiating border is comprised between 2 mm and 20 mm;
  when the tube is in the initial state, the distance between the first end of the tube and the second end of the differentiating border is comprised between 6 mm and 9 mm;
  the visual appearance given to the external surface of the tube by the differentiating border is a uniform color, while the visual appearance of the external surface of the tube outside the differentiating border is the color of the material of the tube, which is uniform;
  the differentiating border is formed by an external coating of the tube;
  the welded constriction is flat and extends from the first end of the tube to the transition zone;
  the welded constriction is flat and extends from the transition zone to a nipple extending between the welded constriction and the first end of the tube;
  the device forms a straw comprising, in addition to the tube, a stopper disposed in the neighborhood of the second end of the tube in the initial state; and/or the device forms a preservation tube having in the initial state a glove finger shape of which the first end is open in the initial state and of which the second end is closed in the initial state.

According to a second aspect, the invention is also directed to a range of several devices for preserving a predetermined dose of liquid-based substance, comprising a device as set out above and a similar device but without the differentiating border.

The disclosure of the invention will now be continued with the detailed description of preferred embodiments, given below by way of non-limiting illustration, with reference to the appended drawings. In these.

Figure 1:
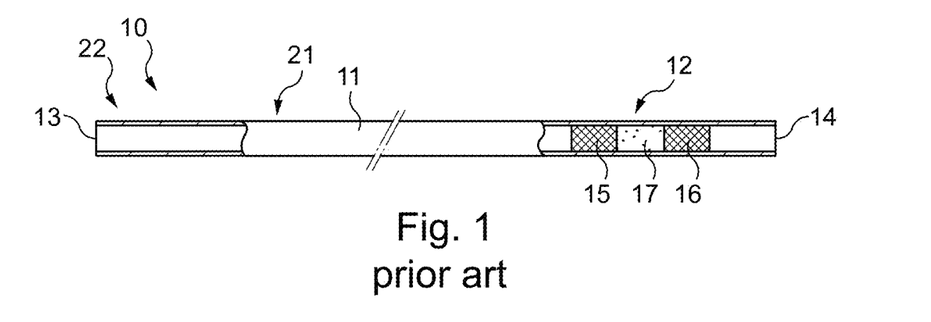
FIG. 1 is a diagrammatic view in longitudinal cross-section of a conventional straw in the initial state

FIG. 1 shows a conventional straw 10 formed by a tube 11 and by a stopper 12.

The tube 11 extends between an end 13 and an end 14. The tube 11 is of weldable plastic material. More specifically, the tube 11 is of extruded plastic material compatible with cryogenic temperatures (77 K) and which is thermo-fusible, which enables it to be obturated by welding between the jaws having heating elements or ultrasonic elements which pinch it.

The inside diameter of the tube 11 is for example 1.6 or 2.5 mm and its length is of the order of 133 mm.

The stopper 12, which is engaged in the tube 11, is of the three-part type originally described in French patent 995.878, corresponding to British patent 669,265, i.e. formed by two plugs 15 and 16 made from a fibrous substance enclosing a powder 17 which, on contact with a liquid, is capable of transforming into an impermeable gel or paste adhering to the wall of the tube.

The straw 10 is conventionally provided for the storage of a predetermined dose of a liquid-based substance, in particular a biological substance, for example pure or diluted animal semen or a storage medium containing embryos.

In FIG. 1, the straw 10 is shown in the initial state, that is to say not yet containing the dose of liquid-based substance which must be preserved therein.

In the filled state, the stopper 12 is in the same position as in FIG. 1, that is to say disposed in the neighborhood of the end 14, and the dose of substance is disposed in the tube 11 between the stopper 12 and the end 13.

In order to fill the straw, the end 14 neighboring the stopper 12 is placed in communication with a vacuum source while the end 13 is placed in communication with a vessel containing the substance to be introduced into the straw. The air initially contained between the stopper 12 and the end 13 is sucked through the stopper 12 while the substance progresses within the tube 11 until it encounters the stopper 12, which it cannot pass, since the stopper 12 becomes fluid-tight in contact with the liquid contained in that substance.

Figure 2:
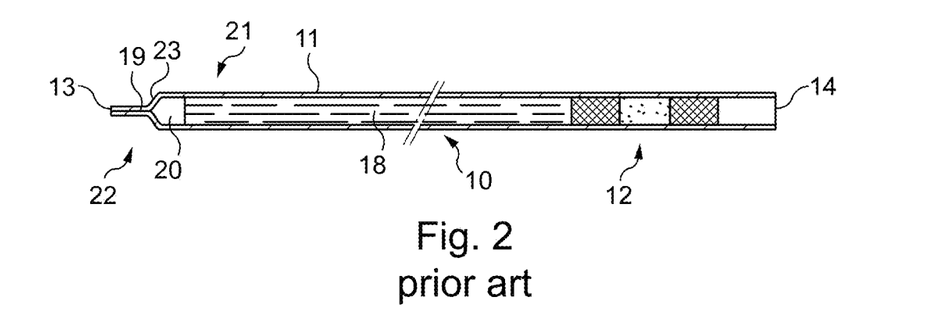
FIG. 2 is a view similar to FIG. 1 but showing the straw in a filled state and obturated.

FIG. 2 shows the straw 10 in the filled state, that is to say containing the dose 18 of liquid-based substance.

FIG. 2 shows more specifically the straw 10 in the filled obturated state, the zone neighboring the end 13 of the tube 11 having been obturated by crushing and welding, that zone having been clamped between jaws brought to a temperature greater than the melting temperature of the material of the tube 11, such that is forms a welded constriction 19. As a variant, rather than heating elements, the jaws carry ultrasonic elements to carry out the welding (the heat locally making the material of the tube 11 melt is due to the friction generated by the ultrasonic elements).

It is also possible to obturate the tube 11 in the same way in the zone neighboring the end 14 if a particularly hermetic obturation of the tube 11 is desired, otherwise the stopper 12 suffices for the dose 18 of liquid-based substance to remain in the tube 11.

Between the welded constriction 19 and the dose 18 of liquid-based substance, there remains an air bubble 20 which is useful for avoiding rupture of the straw 10 on freezing the dose 18, which is accompanied by an increase in volume.

To empty the straw 10, for example after a period of preservation in liquid nitrogen and after thawing, the tube 11 is cut short of the welded constriction 19, which creates a new end of the tube 11 then the stopper is made to slide towards that new end, in the manner of a piston, such that the dose 18 of substance is expelled from the tube 11 by the new end.

In the straw 10, the tube 11 comprises a receiving section 21 provided to contain the dose 18 of liquid-based substance and an obturating section 22 provided to obturate the tube 11 after the receiving section 21 has been filled with the dose 18.

The obturating section 22 extends between the receiving section 21 and the end 13.

The receiving section 21 extends between the obturating section 22 and the stopper 12.

In the initial state of the straw 10 (FIG. 1), the tube 11 is in an initial state in which the receiving section 21 and the obturating section 22 are of circular cross-section.

In the filled and obturated state of the straw 10 (FIG. 2), the tube 11 is in a state of use in which:
  the receiving section 21 is of circular cross-section; and
  the obturating section 22 comprises the welded constriction 19 of the wall of the tube 11 and comprises a transition zone 23 between the welded constriction 19 and the receiving section 21.

Figure 3:
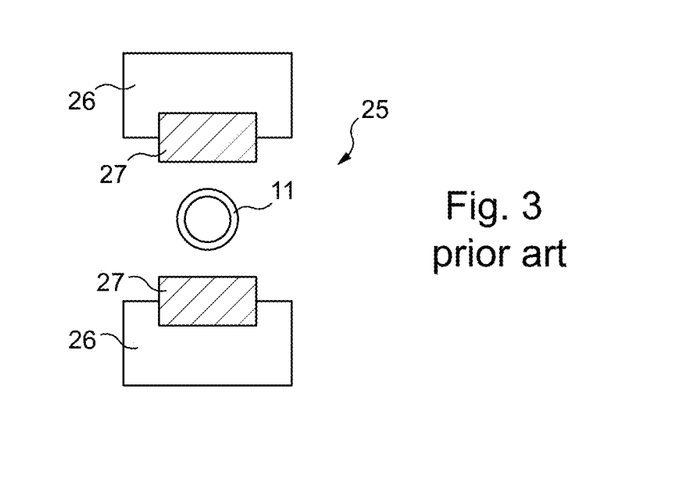
FIG. 3 diagrammatically shows the jaws of a conventional obturating machine as well as the tube of the straw disposed in the initial state between the jaws.

To produce the welded constriction 19, an obturating machine is used such as the machine 25 shown very diagrammatically in FIG. 3.

The machine 25 comprises two jaws 26 each slidingly movable to pass from the position shown in which the jaws 26 are away from each other to a position in which the jaws 26 have been brought towards each other. The driving of the jaws 26 is carried out manually or with actuation, for example by virtue of jacks.

Each of the jaws 26 comprises a welding element (using heat or ultrasound) 27 on its face which faces the other jaw 26.

As illustrated in FIG. 3, the tube 11 is provided to be positioned in relation to each jaw 26 with the obturating section 22 opposite the welding element 27.

Once the tube 11 has been correctly positioned, the jaws 26 are brought towards each other in order to crush the obturating section 22 in its part situated between the two welding elements 27, the jaws 26 being held applied to each other.

The jaws 26 are next moved apart from each other to resume the resting position illustrated in FIG. 3.

Here, the welding elements 27 are flat and relatively wide, such that the welded constriction 19 is flat and extends from the end 13 to the transition zone 23.

The straw 10, in the filled and obturated state, is placed in a preservation chamber, in general a cryogenic preservation chamber formed by a vessel containing liquid nitrogen in which the straw 10 is plunged while being held vertically with the stopper 12 downward and the obturating section 22 upward.

The straw 10 is in general held vertically when placed in a goblet together with other straws. The straws placed in a goblet are in general grouped by virtue of compartments, for example formed by sheaths of circular or hexagonal cross-section called Visotubes.

The operator who has to retrieve straws from a vessel generally sees the different straws contained in that vessel from above.

To identify the different straws, there are different colors for the material of the Visotubes and for the material of the tubes 11 of the straws 10.

In general, the operator identifies the straws concerned in the vessel by virtue of these different colors. For example, he knows that the straws to retrieve are in a green Visotube and that their tube is white.

A description will now be given of a straw in accordance with the invention with the aid of FIGS. 4 to 7.

To simplify, the same numerical references are kept as for the conventional straw illustrated in FIGS. 1 and 2.

The straw 10 according to the invention is identical to the conventional straw 10 illustrated in FIGS. 1 and 2, apart from the fact that, on part of the obturating section 22, the tube 11 comprises a differentiating border 28 giving the external surface of the tube 11 a different visual appearance from the visual appearance of the external surface of the tube 11 outside the border 28.

Figure 4:
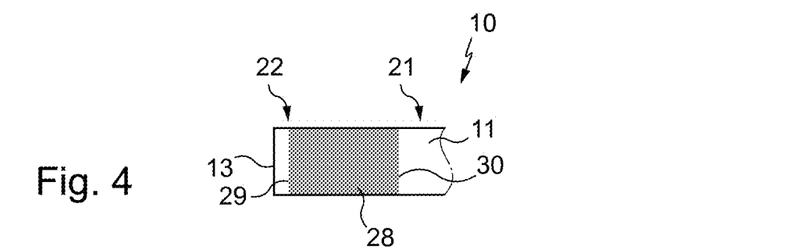
FIG. 4 is a partial view in elevation showing the obturating section and part of the receiving section of the tube of a straw in accordance with the invention, in the initial state.

Here, the border 28 is situated over the entire obturating section 22 except that the border 28 is away from the end 13. The border 28 is also situated over part of the receiving section 21 neighboring the obturating section 22.

The border 28 extends between an end 29 oriented towards the end 13 and an end 30 with an opposite orientation to the end 13, the end 29 being situated in the obturating section 22 away from the end 13 and the end 30 being in the receiving section 21.

Figure 5:
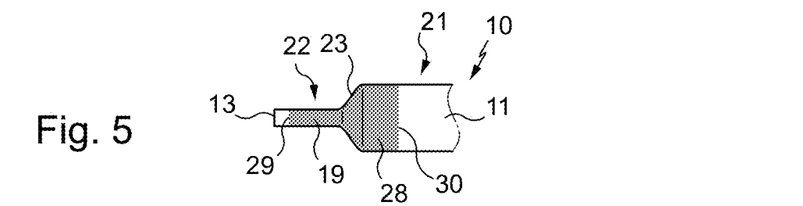
FIG. 5 is a similar view to FIG. 4 but with the tube of the straw in the state of use.
Figure 6:
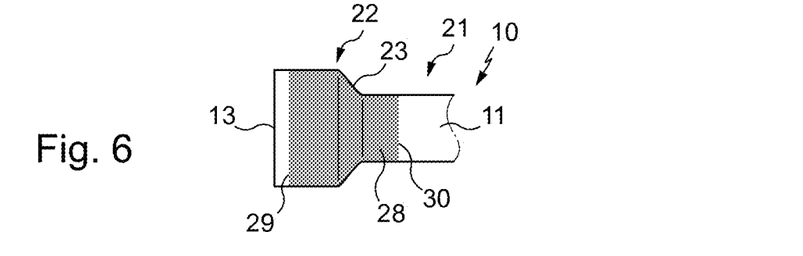
FIGS. 6 and 7 are similar views to FIG. 5, but respectively in plan and from the tip.
Figure 7:
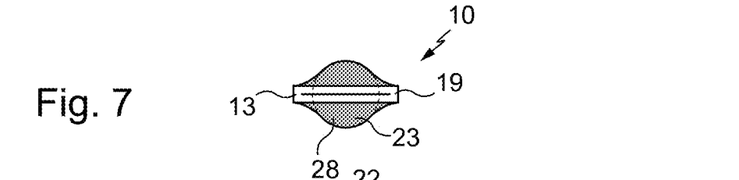

FIGS. 5 to 7 show the state of use of the tube 11 of the straw 10 illustrated in FIG. 4 when the welded constriction 19 is made as in FIG. 2, that is to say that the welded constriction 19 is flat and extends from the end 13 to the transition zone 23.

As FIG. 7 shows, the transition zone 23 is visible behind the welded constriction 19 when the tube 11 is viewed from the end 13, and therefore the border 28 is visible at least over the transition zone 23.

It will be noted that in FIG. 7, the observer is aligned with the general direction of the tube 11 whereas in practice the operator having to retrieve straws from the vessel of the preservation chamber sees or may see the straws slightly obliquely. Thus, in practice, the operator sees more of the border 28 than in FIG. 7. In particular, he also sees the border 28 on the welded constriction 19 and/or on the receiving section 21.

Figure 8:
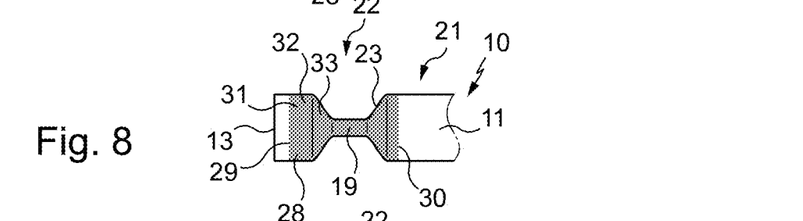
FIGS. 8 to 10 are similar views to FIGS. 5 to 7, but for a different form of the obturating section in which the welded constriction is at a distance from the illustrated end of the tube.
Figure 9:
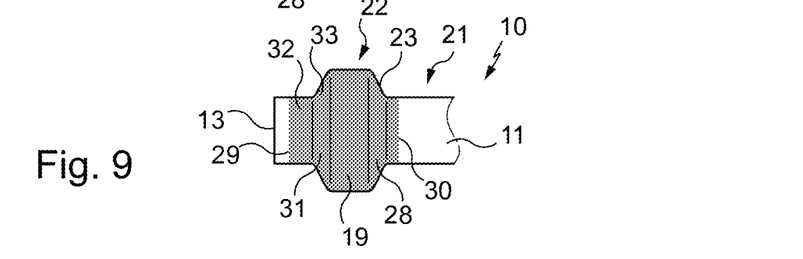
Figure 10:
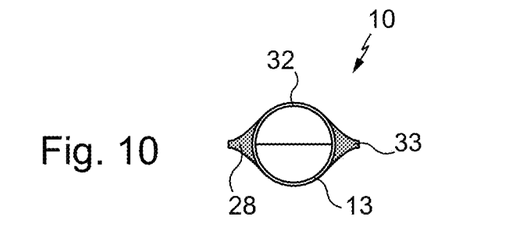

FIGS. 8 to 10 show the state of use of the tube 11 of the straw 10 illustrated in FIG. 4 when the welded constriction 19 is produced with jaws 26 of which the welding members 27 are flat and relatively narrow.

The welded constriction 19 is flat but, as the welding members 27 are relatively narrow, the welded constriction 19 does not extend to the end 13. There is a nipple 31 between the end 13 and the welded constriction 19.

The nipple 31 comprises an end section 32 which is of circular cross-section and a transition section 33 between the end section 32 and the welded constriction 19.

As FIG. 10 shows, the transition section 33 is visible behind the end section 32 when the tube 11 is viewed from the end 13, and therefore the border 28 is visible at least over the transition section 33.

It will be noted that in FIG. 10, the observer is aligned with the general direction of the tube 11 whereas in practice the operator having to retrieve straws from the vessel of the preservation chamber sees or may see the straws slightly obliquely. Thus, in practice, the operator sees more of the border 28 than in FIG. 10. In particular, he also sees the border 28 on the transition zone 23 and/or on the receiving section 21.

Figure 11:
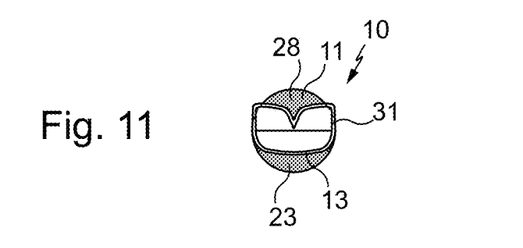
FIG. 11 is a similar view to FIG. 10, but for a different form of the welded constriction and of the nipple existing between the welded constriction and the illustrated end of the tube.

FIG. 11 shows the state of use of the tube 11 of the straw 10 illustrated in FIG. 4 when the welded constriction 19 is produced with jaws 26 of which the welding elements 27 are similar to those that produced the welded constriction 19 shown in FIGS. 8 and 9, but with the welding element 27 situated to the side seen at the bottom in FIG. 11 being U-shaped and the welding element situated to the side seen at the top being flat and entering between the cheeks of the U-shaped welding element such that the wall of the tube 11 is pinched between the flat element and the bottom of the U-shaped element. The spacing between the cheeks of the U-shaped element matches the diameter of the tube 11.

The welded constriction 19 is thus flat and of the same width as the tube 11. The nipple 31 has a B-shaped cross-section having substantially the same width as the tube 11.

As FIG. 11 shows, the transition zone 23 is visible behind the nipple 31 when the tube 11 is viewed from the end 13, and therefore the border 28 is visible at least over the transition zone 23.

It will be noted that in FIG. 11, the observer is aligned with the general direction of the tube 11 whereas in practice the operator having to retrieve straws from the vessel of the preservation chamber sees or may see the straws slightly obliquely. Thus, in practice, the operator sees more of the border 28 than in FIG. 11. In particular, he also sees the border 28 on the nipple 31 and/or on the receiving section 21.

Thus, in each of the configurations of the obturating section 22 illustrated in FIGS. 5 to 11, the border 28 of the tube 11 of the straw according to the invention may be seen from the end 13.

Therefore, the operator having to retrieve straws from the vessel of the preservation chamber and who sees the different straws contained in that vessel from above, that is to say from the end 13, will be able to discriminate between two neighboring containers of which one is identical to the other except for the border 28.

Here, the visual appearance given to the external surface of the tube 11 by the border 28 is of uniform color, for example the color magenta, whereas the visual appearance of the external surface of the tube 11 outside the border 28 is the color of the material of the tube 11, which is uniform, for example white in color.

In this example, the operator who sees the different straws contained in this vessel from above will be able to discriminate between neighboring straws of which one has a tube having an external surface entirely white in color and the other a tube having an external surface of the same white color but with the border 28 magenta in color.

In practice, users have available a range of straws 10 formed by straws 10 with a border 28 and by straws 10 that are similar but without a border 28. According to the substance to preserve, the straw 10 with or without a border 28 is used. For example, the presence or absence of the border 28 indicates that the semen of a bovine breed is male or female.

Here, the border 28 is annular when the tube 11 is in the initial state. More specifically, in the illustrated example, when the tube 11 is in the initial state, the end 29 and the end 30 are parallel to the end 13.

When the tube 11 is in the initial state, the distance between the end 29 and the end 13 (the gap between the border 28 and the end 13) is preferably comprised between 0.1 mm and 4 mm.

Such a gap between the border 28 and the end 13 is particularly suitable to see, from the end 13, in addition to the border, the external surface of the tube 11 outside the border (visible in the gap), which is favorable to the identification of the device to which the tube belongs.

Here, the tube 11 of the straws 10 with and without a border 28 is manufactured in the same way. For the straws concerned, the border is added onto the tube 11 by an external coating, here of ink deposited by pad printing: a pad having at its end a cavity of semi-circular cross-section is placed in contact with a cliché containing ink to deposit then the pad is moved to be placed in contact with the external surface of the tube 11 then, while the contact between the tube and the pad is maintained, the tube 11 is rotated such that the deposit of ink is annular (otherwise, the deposit of ink would be semi-annular).

The gap between the border 28 and the end 13 also makes it possible to avoid the ink entering the tube 11, and thus to ensure that the substance contained in the tube 11 does not enter into contact with the ink.

The ink used is for example of the type that is polymerizable with ultra-violet light.

Such inks in particular provide a certain resistance to the combined effects of pressure and temperature during heat welding with jaws such as the jaws 26.

Such inks also provide a certain resistance to the cycles of freezing/thawing in a cryogenic liquid such as liquid nitrogen.

Lastly, such inks may receive printing, for example of characters printed by ink jet.

When the tube 11 is in the initial state, the distance between the end 29 and the end 30 (length of the border 28) is preferably comprised between 2 mm and 20 mm.

Such a length of the border 28 makes it possible at the same time for it to be visible and for the external surface of the tube 11 outside the border 28 also to be clearly visible.

Here, the end 30 is situated at the location at which the tube 11 has to be cut to open the straw. The end 30 thus forms a marker for cutting up the tube 11.

To implement this feature, when the tube 11 is in the initial state, the distance between the end 13 and the end 30 is preferably comprised between 6 mm and 9 mm.

Figure 12:
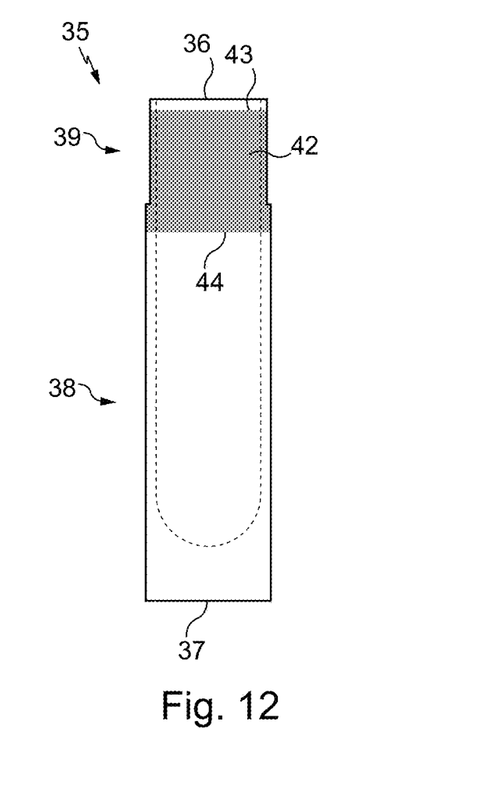
FIG. 12 is an elevation view of a tube for packaging in the shape of a glove finger in accordance with the invention, in the initial state.
Figure 13:
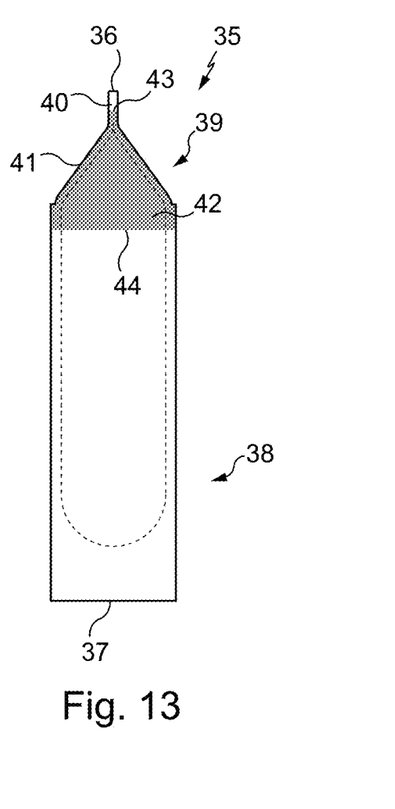
FIG. 13 is a similar view to FIG. 12 but with the tube in the state of use.

The packaging tube 35, illustrated in FIGS. 12 and 13, will now be described.

The tube 35 extends between an end 36 and an end 37, with a receiving section 38 to contain the dose of liquid-based substance and an obturating section 39 provided to obturate the tube 35 after the receiving section 38 has been filled with the dose of liquid-based substance. The obturating section 39 extends between the receiving section 38 and the end 36. The receiving section 38 extends between the obturating section 39 and the end 37.

In the initial state (FIG. 12), the tube 35 has the shape of a glove finger with the end 36 open and the end 37 closed.

The tube 35 is made from a plastic material or a group of plastic materials enabling it to be obturated by crushing and welding of the obturating section 39.

Such a tube is described in particular in French patent application 2 912 727, to which corresponds the U.S. patent application US 2010/0107560.

Biological substances packaged in such a tube are in particular tissue samples. Here, the tube 35 corresponds to one of the examples described in French patent application 2 912 727 with a height of 48 mm and an inside diameter of 9.8 mm, with a relatively large wall thickness (of the order of 1 mm) except in the obturating section 39 where the thickness is smaller, for example 0.6 mm, to facilitate the formation of a welded constriction 40 (FIG. 13), similar to the welded constriction 19 of the straw 10, by a machine similar to the machine 25.

In the initial state of the tube 35 (FIG. 12), the receiving section 38 and the obturating section 39 are of circular cross-section.

In the filled and obturated state (FIG. 13), the tube 35 is in a state of use in which:
 the receiving section 38 is of circular cross-section; and
 the obturating section 39 comprises the welded constriction 40 of the wall of the tube 35, which forms a hermetic seal, and comprises a transition zone 41 between the welded constriction 40 and the receiving section 38.

Here, the form of the welded constriction 40 is like the form of the welded constriction 19 illustrated in FIGS. 5 to 7, that is to say that it is flat and extends from the end 36 to the transition zone 41.

The tube 35, in the filled and obturated state, is placed in a preservation chamber in the same way as the straw 10, with the closed end 37 downward and the obturating section 39 upward.

In accordance with the invention, the tube 35 comprises over part of the obturating section 39 a differentiating border 42 giving the external surface of the tube 35 a different visual appearance from the visual appearance of the tube 35 outside the external surface 42.

Here, the border 42 is situated on the obturating section 39 in the same way as the border 28 is situated on the obturating section 22.

Thus, the border 42 is situated over the entire obturating section 39 except that the border 42 is away from the end 36. The border 42 is also situated over part of the receiving section 38 neighboring the obturating section 39. The border 42 extends between an end 43 oriented towards the end 36 and an end 44 oriented in the opposite direction to the end 36, the end 43 being situated in the obturating section 39 away from the end 36 and the end 44 being in the receiving section 38.

As is shown in FIG. 7, the transition zone 41 is visible behind the welded constriction 40 when the tube 35 is viewed from the end 36, and therefore the border 42 is visible at least over the transition zone 41.

In general terms, the description given above for the border 28 of the tube 11 applies to the border 42 of the tube 35, including for variants not illustrated of the state of use of the tube 35 similar to the states of use of the tube 11 illustrated in FIGS. 8 and 9 and in FIG. 11.

In variants not shown, the differentiating border such as 28 or 42 is arranged differently while being configured to be visible from the first end such as 13 or 36 when the tube such as 11 or 35 is in the state of use, in particular with a different longitudinal extent, for example by being present over the entirety of the obturating section such as 22 or 39 or present solely over the transition zone such as 23 or 41, and/or with a different angular extent, for example semi-annular.

In variants not shown, the visual appearance given to the external surface of the tube by the differentiating border such as 28 or 42 is different from a uniform color, for example a pattern with annular stripes, and/or the visual appearance of the external surface of the tube such as 11 or 35 outside the border is different from a uniform color, for example a pattern with longitudinal stripes.

In variants not shown, the differentiating border such as 28 or 42 is formed by an external coating deposited other than by pad printing, for example by screen printing; and/or the coating is other than an ink, for example a paint; and/or the differentiating border is formed other than by a coating, for example by locally modifying the color of the material of the tube.

In variants not shown, the obturating section such as 22 or 39 is of different form, for example with the welded constriction such as 19 or 40 not being flat, for example with a V-shaped cross-section.

Numerous other variants are possible according to circumstances, and in this connection it is to be noted that the invention is not limited to the examples described and shown.

The invention claimed is:

1. A device for preserving a predetermined dose of liquid-based substance comprising a tube of weldable plastic material extending between a first end and a second end, the tube comprising a receiving section provided to contain said predetermined dose of liquid-based substance and an obturating section provided to obturate the tube after the receiving section has been filled with said predetermined dose of liquid-based substance, the obturating section extending between the first end of the tube and the receiving section, the tube having:
   an initial state in which the receiving section and the obturating section are of circular cross-section; and
   a state of use in which the receiving section is of circular cross-section while the obturating section comprises a welded constriction of the wall of the tube forming a hermetic seal and comprises a transition zone between the welded constriction and the receiving section;
wherein the tube comprises a differentiating border stripe over at least part of the obturating section giving the external surface of the tube a different visual appearance from the visual appearance of the external surface of the tube outside the differentiating border stripe, the differentiating border stripe being configured to be visible from the first end when the tube is in the state of use, the differentiating border stripe being configured such that the differentiating border stripe and the external surface of the tube outside the differentiating border stripe are both visible from all circumferential directions when the tube is in the state of use.

2. The device for according to claim 1, wherein the differentiating border stripe is present at least over the transition zone.

3. The device according to claim 1, wherein the differentiating border stripe is present at least over part of the receiving section neighboring the obturating section.

4. The device according to claim 1, wherein the differentiating border stripe is annular when the tube is in the initial state.

5. The device according to claim 1, wherein the differentiating border stripe extends between a first end oriented towards the first end of the tube and a second end with an opposite orientation to the first end of the tube, the first end of the differentiating border stripe being situated in the obturating section away from the first end of the tube and the second end of the differentiating border stripe being in the receiving section.

6. The device according to claim 5, wherein when the tube is in the initial state, the distance between the first end of the differentiating border stripe and the first end of the tube is comprised between 0.1 mm and 4 mm.

7. The device according to claim 5, wherein when the tube is in the initial state, the distance between the first end and the second end of the differentiating border stripe is comprised between 2 mm and 20 mm.

8. The device according to claim 5, wherein when the tube is in the initial state, the distance between the first end of the tube and the second end of the differentiating border stripe is comprised between 6 mm and 9 mm.

9. The device according to claim 1, wherein the visual appearance given to the external surface of the tube by the differentiating border stripe is a uniform color, while the visual appearance of the external surface of the tube outside the differentiating border stripe is the color of the material of the tube, the color of the material of the tube being uniform.

10. The device according to claim 1, wherein the differentiating border stripe is formed by an external coating of the tube.

11. The device according to claim 1, wherein the welded constriction is flat and extends from the first end of the tube to the transition zone.

12. The device according to claim 1, wherein the welded constriction is flat and extends from the transition zone to a nipple extending between the welded constriction and the first end of the tube.

13. The device according to claim 1, wherein it forms a straw comprising, in addition to the tube, a stopper disposed closer to the second end of the tube than to the first end of the tube in the initial state.

14. The device according to claim 1, wherein it forms a preservation tube having in the initial state a glove finger shape of which the first end is open in the initial state and of which the second end is closed in the initial state.

15. The device according to claim 1, the differentiating border stripe being configured such that the differentiating border stripe and the external surface of the tube outside the differentiating border stripe are both visible from an axial direction looking toward the first end of the tube when the tube is in the state of use.

16. A plurality of devices for preserving a predetermined dose of liquid-based substance, each of the plurality of devices comprising a tube of weldable plastic material extending between a first end and a second end, the tube comprising a receiving section provided to contain said predetermined dose of liquid-based substance and an obturating section provided to obturate the tube after the receiving section has been filled with said predetermined dose of liquid-based substance, the obturating section extending between the first end of the tube and the receiving section, the tube having:
- an initial state in which the receiving section and the obturating section are of circular cross-section; and
- a state of use in which the receiving section is of circular cross-section while the obturating section comprises a welded constriction of the wall of the tube forming a hermetic seal and comprises a transition zone between the welded constriction and the receiving section;
- a first of the plurality of devices, but not a second of the plurality of devices being wherein the tube comprises a differentiating border stripe over at least part of the obturating section giving the external surface of the tube a different visual appearance from the visual appearance of the external surface of the tube outside the differentiating border stripe, the differentiating border stripe being configured to be visible from the first end when the tube is in the state of use, the differentiating border stripe being configured such that the differentiating border stripe and the external surface of the tube outside the differentiating border stripe are both visible from all circumferential directions when the tube is in the state of use.

* * * * *